United States Patent
Hong

[11] Patent Number: 5,552,246
[45] Date of Patent: *Sep. 3, 1996

[54] MATERIALS FOR HYDROGEN STORAGE, HYDRIDE ELECTRODES AND HYDRIDE BATTERIES

[76] Inventor: Kuochih Hong, 1790 Rollingwoods Dr., Troy, Mich. 48098

[*] Notice: The term of this patent shall not extend beyond the expiration date of Pat. No. 5,541,017.

[21] Appl. No.: 491,524

[22] Filed: Jun. 19, 1995

Related U.S. Application Data

[63] Continuation-in-part of Ser. No. 212,354, Mar. 14, 1994, Pat. No. 5,541,017.

[51] Int. Cl.⁶ .................................................. H01M 4/02
[52] U.S. Cl. .................... 429/218; 429/59; 429/101; 429/220; 429/222; 429/223; 429/224; 420/900
[58] Field of Search ........................... 429/59, 101, 218, 429/220, 222, 223, 224; 420/900

[56] References Cited

U.S. PATENT DOCUMENTS

| | | |
|---|---|---|
| 3,660,082 | 5/1972 | Negishi et al. |
| 4,160,014 | 7/1979 | Gamo et al. |
| 4,195,989 | 4/1980 | Gamo et al. |
| 4,370,163 | 1/1983 | Muriwaki et al. |
| 4,431,561 | 2/1984 | Urshisky et al. |
| 4,440,736 | 4/1984 | Maclano et al. |
| 4,457,891 | 7/1984 | Bernauer et al. |
| 4,551,400 | 11/1985 | Sapru et al. |
| 4,623,597 | 11/1986 | Sapru et al. |
| 4,716,088 | 12/1987 | Reichman et al. |
| 4,728,586 | 3/1988 | Venkatesan et al. |
| 4,849,205 | 7/1989 | Hong ........................ 423/644 |
| 4,946,646 | 8/1990 | Gamo et al. |
| 5,006,328 | 4/1991 | Hong ........................ 423/644 |
| 5,096,667 | 3/1992 | Fetcenko. |
| 5,104,617 | 4/1992 | Fetcenko et al. |
| 5,238,756 | 8/1993 | Fetcenko. |
| 5,242,656 | 9/1993 | Zhang et al. |

Primary Examiner—M. Nuzzolillo

[57] ABSTRACT

The present invention discloses four main groups of hydrogen storage/hydride electrode materials for electrochemical applications as the active material of the negative electrode of a hydride battery. The compositions of these four groups are represented by the formulas: (1) $Ti_aNb_bNi_cR_xD_yQ_p$, (2) $Ti_aHf_b Ni_cR_xD_yQ_p$, (3) $Ti_aTa_bNi_cR_xD_yQ_p$, (4) $Ti_aV_bNi_cR_xD_yQ_p$, and its hydride thereof; where R is at least one element selected from the group consisting of B, Hf, Sc, Zn, Sb, W, Sn, N, O, Ge, Ga, P, S, and the alkali metals; D is at least one element selected from the group consisting of Mn, Cu, Si, Cr, and Mm, where Mm is the mischmetal; Q is least one element selected from the group consisting of C, Mg, Ca, Sr, Ba, Al, Si, V, Cr, Mn, Fe, Co, Cu, Zr, Mo, Ag, Pd, Y, Ta, La, Ce, and Mm, where Mm is the mischmetal; and where the atomic mole ratios: a, b, c, x, y and p are defined by: $0.10 \leq a \leq 0.85$, $0.001 \leq b \leq 0.50$, $0.02 \leq c \leq 0.85$, $0 \leq x \leq 0.30$, $0 \leq y \leq 0.30$, $0 \leq p \leq 0.45$, $b+y<0.62$, and $a+b+c+x+y+p=1.00$; and if present, $Mm \leq 12$ at. %; preferably, $0.15 \leq a \leq 0.63$, $0.01 \leq b \leq 0.38$, $0.15 \leq c \leq 0.60$, $0 \leq 0.15$, $0 \leq y \leq 0.15$ and $0 \leq p \leq 0.30$.

24 Claims, 1 Drawing Sheet

MATERIALS FOR HYDROGEN STORAGE, HYDRIDE ELECTRODES AND HYDRIDE BATTERIES

CROSS-REFERENCE TO RELATED APPLICATIONS

This application is a continuation in part application of application Ser. No. 08/212,354 filed on Mar. 14, 1994, now U.S. Pat. No. 5,541,017.

BACKGROUND OF THE INVENTION

1. Field of the Invention

This invention relates to multicomponent alloys for uses in hydrogen storage, and rechargeable hydrogen storage electrode applications. More particularly, the invention relates to rechargeable batteries comprising a nickel-hydride, or silver-hydride couple in which the negative electrode is made of a hydride/hydrogen storage alloy.

2. The Related Art

Sapru et. al. in U.S. Pat. No. 4,551,400 and Rechman et al. in U.S. Pat. No. 4,716,088 reported a rechargeable hydride battery using a pseudo TiV2-type hydrogen storage alloy as the active material of the negative electrode. Their alloys, the V-based alloys: Ti-V-Ni, Ti-Zr-V-Ni and Ti-Cr-V-Ni, each have a short cycle life, high self-discharge rate, and/or are very difficult to activate. Venkatesan et al. in U.S. Pat. No. 4,728,586, and Fetcenko et al. in U.S. Pat. Nos. 5,096,667, 5,104,617 and 5,238,756 disclose a Ti-Zr-V-Ni-Cr-based alloy for the hydride electrode. This kind of alloy still has some weaknesses. The alloy disclosed in these patents contains Ti+Zr from 16.5 at. % to 37.9 at. % and V+Ni from 34.8 to 70.98 at. %. As a result, as given in their examples, the alloys disclosed contain a substantial amount of expensive vanadium metal and have a high corrosion rate in an alkaline medium. All above prior arts do not teach the use and the benefits of niobium (Nb) metal in a hydrogen storage alloy. No information is given in regarding how to use any element selected from the group of: B, Hf, Sc, Zn, Ag, Sb, W, Sn, N, O, Ge, Ga, the alkali metals, P, and S in an alloy. The addition of a suitable amount of these elements has many advantages. Gamo et al in U.S. Pat. No. 4,946,646 disclose hydrogen storage alloys with the general formula, $AB_a$, where A is at least one element selected from the group consisting of Zr, Ti, Hf, Ta, Y, Ca, Mg, La, Ce, Pr, Mm, Nb, Nd, Mo, Al and Si; B is at least one element selected from the group consisting of Ni, V, Cr, Mn, Fe, Co, Cu, Zn, Al, Si, Nb, Mo, W, Mg, Ca, Y, Ta, Pd, Ag, Au, Cd, In, Sn, Bi, La, Ce, Mm, Pr, Nd, Th and Sm; provided that A and B are different from each other, and a is from 1.0 to 2.5. Although Gamo lists 162 alloys, there are only nineteen alloys which consist of eighteen 5-element alloys and one 6-element alloy. These 19 alloys are all Zr-based containing at least 30 at. % of Zr. Gamo teaches four classes that are also all Zr-based alloys: (1) $ZrV_bNi_c$, (2) $ZrMo_dNi_e$, (3) $Zr_fV_gNi_hM_i$, where M is at least one element selected from a group of 27 elements without Ti; (4) $A'B'_jNi_k$, where A' is Zr or a mixture of at least 30 at. % of Zr and the balance of at least one element selected from the group of Ti, Hf, Al and Si; $ZrMn_nCr_oNi_p$ is the only subclass given in this class. Other that the above Zr-based alloys, Gamo does not teach a specific quidance for the selection of A from the 16 elements and B from the 31 elements. Specifically, Gamo does not teach a specific quidance to formulate a non-Zr-based alloy which has 5 or more than five elements. Gamo does not teach the use of niobium (Nb) metal and its benefits in a hydrogen storage alloy. As with vanadium metal, Zr is also relatively expensive. Therefore, a Zr-based hydrogen storage alloy has a high cost. In addition, the Zr-based hydrogen storage alloy/hydirde electrode is very difficult to activate and an insoluble oxide layer forms easily on the surface. Therefore, the charging efficiency and rate capabilty are very poor. Consequently, the sealed battery made has a high internal pressure and short cycle life.

Hong in U.S. Pat. Nos. 4,849,205 and 5,006,328 disclosed hydride storage electrode alloys: (1) Ti-Zr-Ni-Cr-M alloy, (2) Ti-Cr-Zr-Ni-V-M alloy, (3) Ti-Zr-V-Ni-M alloy, (4) Ti-Mn-V-Ni-M alloy, where M is an element selected from Al, Si, Fe, Co, Cu, Nb, Ln (rare earth metal) and M is less than 6.25 at. %. In addition, Hong teaches a method to develop an alloy for hydrogen storage and hydride electrode applications. Hong does teach the use of Nb. However, little or no information is given in regarding how to use any element selected from the group of: B, Hf, Sc, Zn, Sb, W, Sn, N, O, Ge, Ga, the alkali metals, P, and S in an alloy. The addition of a suitable amount of these elements has many advantages.

To solve the problems, the present invention provides new alloys for hydrogen storage and particularly for rechargeable hydride electrode and batteries applications.

SUMMARY OF THE INVENTION

The present invention discloses an improved multicomponent alloy for hydrogen storage and rechargeable hydride electrode applications, and particularly for the rechargeable hydride battery applications. The alloy has a composition selected from one of the following four groups:

Group 1. $Ti_aNb_bNi_cR_xD_yQ_p$
Group 2. $Ti_aHf_bNi_cR_xD_yQ_p$
Group 3. $Ti_aTa_bNi_cR_xD_yQ_p$
Group 4. $Ti_aV_bNi_cR_xD_yQ_p$ and its hydride thereof, where R is at least one element selected from the group consisting of B, Hf, Sc, Zn, Sb, W, Sn, N, O, Ge, Ga, P, S, and alkali metals; D is at least one element selected from the group consisting of Mn, Cu, Si, Cr, and Mm, where Mm is the mischmetal; Q is at least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm, where Mm is the mischmetal; and where the atomic mole ratios: a, b, c, x, y and p are defined by: $0.10 \leq a \leq 0.85$, $0.001 \leq b \leq 0.50$, $0.02 \leq c \leq 0.85$, $0 \leq x \leq 0.30$, $0 \leq y \leq 0.30$, $0 \leq p \leq 0.45$, $b+y<0.62$, and $a+b+c+x+y+p=1.00$; and if present, $Mm \leq 12$ at. %; preferably, $0.15 \leq a \leq 0.63$, $0.01 \leq b \leq 0.38$, $0.15 \leq c \leq 0.60$, $0<x \leq 0.15$, $0 \leq y \leq 0.15$ and $0 \leq p \leq 0.30$.

In another aspect, this invention is directed to provide a rechargeable electrochemical cell using the improved hydrogen storage alloy given in present invention. The advantages, features and other objects of the present invention will become obvious from the following detailed description.

DETAILED DESCIPTION OF THE INVENTION

Figure 1:
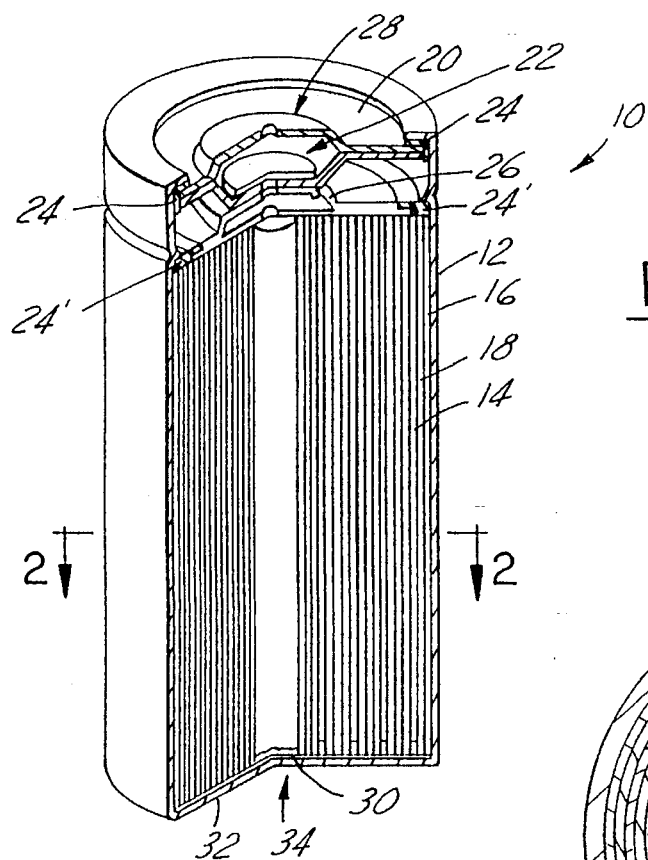
FIG. 1 is a partly sectional perspective view of a battery according to the present invention.

The present invention discloses an improved hydrogen storage/hydride electrode material for a rechargeable metal oxide-hydride battery, and in particular, an improved high capacity nickel-hydride battery.

In a nickel-hydride battery, the electrochemical reactions are as follows:
At the positive electrode (Nickel electrode):

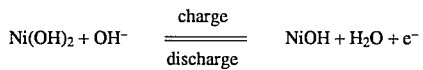

At the negative electrode (hydride electrode):

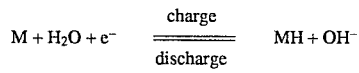

where M and MH are the hydrogen storage alloy and its hydride, respectively.

During overcharge, water electrolysis will occur. Thus, oxygen will be generated at the positive electrode and hydrogen gas will be generated at the negative electrode. In a sealed cell, if the oxygen gas does not recombine with hydrogen, the internal pressure will increase and vent out through the safety valve. But electrolyte will then be lost and cell life is consequently shortened. Other factors, such as poor charge efficiency, will also increase the internal pressure of the cell. A good hydrogen storage/hydride electrode should have good charging efficiency and a high oxygen recombination rate. Thus, the internal pressure in a sealed cell using these alloys is expected to be low and the cycle life will be longer.

The negative electrode of a nickel-hydride battery comprise a body of rechargeable hydrogen storage active material and/or the hydride thereof.

The present invention discloses an improved multicomponent hydrogen storage/hydride electrode material for electrochemical applications as the active material of a negative electrode of a hydride battery. The material has a composition selected from one of the following four groups:

Group 1. $Ti_aNb_bNi_cR_xD_yQ_p$
Group 2. $Ti_aHf_bNi_cR_xD_yQ_p$
Group 3. $Ti_aTa_bNi_cR_xD_yQ_p$
Group 4. $Ti_aV_bNi_cR_xD_yQ_p$ and its hydride thereof, where R is at least one element selected from the group consisting of B, Hf, Sc, Zn, Sb, W, Sn, N, O, Ge, Ga, P, S, and alkali metals; D is at least one element selected from the group consisting of Mn, Cu, Si, Cr, and Mm, where Mm is the mischmetal; Q is at least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm, where Mm is the mischmetal; and where the atomic mole ratios: a, b, c, x, y and p are defined by: $0.10 \leq a \leq 0.85$, $0.001 \, b \leq 0.50$, $0.02 \leq c \leq 0.85$, $0 \leq x \leq 0.30$, $0 \leq y \leq 0.30$, $0 \leq p \leq 0.45$, $b+y<0.62$, and $a+b+c+x+y+p=1.00$; and if present, $Mm \leq 12$ at. %; preferably, $0.15 \leq a \leq 0.63$, $0.01 \leq b \leq 0.38$, $0.15 \leq c \leq 0.60$, $0<x \leq 0.15$, $0 \leq y \leq 0.15$ and $0 \leq p \leq 0.30$.

There are several factors to consider regarding the selection of elements for inclusion in the alloy according to this invention. An ideal hydrogen storage alloy for hydrogen storage/hydride electrode has the following properties:
high capacity,
superior electrochemical catalyst for hydrogen oxidation,
high hydrogen diffusion rate,
suitable hydrogen equilibrium pressure,
excellent corrosion resistence in alkaline solution,
low cost.
Thus a hydride battery made thereof will have a high capacity, good charging efficiency, excellent oxygen recombination rate, low internal pressure, good rate capability, long life and low cost. However, such an ideal hydrogen storage material does not exist. Therefore, the best real solution is an improved hydrogen storage electrode material with optimum properties. Hong in U.S. Pat. No. 5,006,328, teaches the use of heats of hydride formation and the amount of nickel to make a useful alloy that allows for the control of hydrogen equilibrium pressure, capacity, and the electrochemical catalytic property of a hydrogen storage/hydride electrode. The addition of strong hydride former, Hf, Ta or Sc decreases the hydrogen equilibrium pressure and provides good capacity and corrosion resistance of the hydrogen storage/hydride electrode alloy. The inclusion of a suitable amount of unstable hydride formers, B, W, Ag, Sb, Bi, Ge or Ga will destablize a stable hydrogen storage alloy or increase the corrosion resistance, and/or enhance the catalytic property; the rate capability and cycle life are increased without sacrificing total capacity. The inclusion of Li, Na, K, Rb, Cs, Sr, Ba, P or S will remove oxygen, the alloy obtained is cleaner and easier to activate. More importantly, each of these elements can also act as a hydride former, thus increasing the hydogen storage capacity and/or lowering the hydrogen equilibrium pressure. For electrochemical applications, Li, Na, K, Rb, Cs, Ba, and Sr are particularly useful. They are incorporated in some phases in the alloy. These phases will be oxidized in alkaline electrolyte and dissolve as soluble hydroxides such as LiOH. Thus the performance of the cell will improved; specifically, the cycle life will be much longer. The inclusion of a small amount (0.001 to 0.005 at. %) of oxygen or nitrogen in the alloy in many cases results in surface segregation and therefore enhances the catalytic effect. In terms of economy, a hydride former, especially low cost Nb, can replace the expensive V without sacrificing the performance. Similarly, the inclusion of good hydride formers Ti+Hf can also reduce the amount of vanadium used and thus reduce the cost. More importantly, it also can provide an alloy having a good capacity and a desirable low hydrogen equilibrium pressure, and thus reduces the internal pressure in a sealed cell. Furthermore, the use of Hf can reduce or eliminate the use of pure Zr which is also very expensive. Therefore, the cost of the alloy is reduced.

Several exemplary alloys related to the first group of the present invention are:

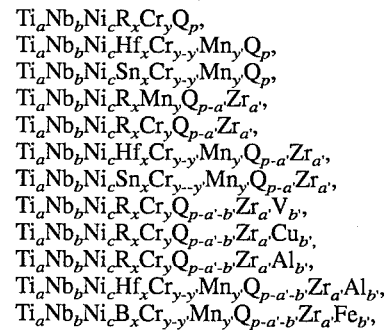

and its hydride thereof; where R is at least one element selected from the group consisting of B, Hf, Sc, Zn, Sb, W, Sn, N, O, Ge, P, S, and alkali metals; Q is at least one element selected from the group consisting of C, Mg, Ca, Sr, Ba, Al, Si, V, Cr, Mn, Fe, Co, Cu, Zr, Mo, Pd, Ag, Y, Ta, La, Ce, and Mm; and where the atomic mole ratios: a, a',b,c,x, y,y', and p are defined by: $0.10 \leq a \leq 0.85$, $0 \leq a' \leq 0.30$, $0.001 \leq b \leq 0.050$, $0 \leq b' \leq 0.30$, $0.02 \leq c \leq 0.85$, $0<x \leq 0.30$, $0 \leq y \leq 0.30$, $0 \leq y' \leq y$, $0 \leq p \leq 0.45$, $b+y<0.62$, and $a+b+c+x+y+p=1.00$; and if present, $Mn \leq 12$ at. %; preferably, $0.15 \leq a \leq 0.63$, $0.01 \leq b \leq 0.38$, $0.15 \leq c \leq 0.60$, $0<x \leq 0.15$, $0 \leq y \leq 0.15$ and $0 \leq p \leq \mathbf{0.30}$.

Several exemplary alloys related to the second group of the present invention are:

$Ti_aHf_bNi_cR_xMn_{y-y'}V_{y'}Q_p$,
$Ti_aHf_bNi_cR_xCr_{y-y'}V_{y'}Q_{p-a'}Zr_{a'}$,
$Ti_aHf_bNi_cR_xCu_yQ_{p-a'}Zr_{a'}$,
$Ti_aHf_bNi_cR_xMn_yQ_{p-a'}Zr_{a'}$,
$Ti_aHf_bNi_cR_xCu_{y-y'}Mn_{y'}Q_{p-a'}Zr_{a'}$,
$Ti_aHf_bNi_cR_xCr_{y-y'}Mm_{y'}Q_{p-a'}Zr_{a'}$,
$Ti_aHf_bNi_cR_xSi_yQ_{p-a'}Zr_{a'}$,
$Ti_aHf_bNi_cR_xSi_yQ_{p-a'}Zr_{a'}$,
$Ti_aHf_bNi_cR_xMm_yQ_{p-a'}Zr_{a'}$, and its hydride thereof; where R is at least one element selected from the group consisting of B, Hf, Sc, Zn, Sb, W, Sn, N, o. Ge, Ga, P, S, and alkali metals; Q is at least on element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm; and where the atomic mole ratios: a,a',b, c,x,y,y', and p are defined by: $0.10 \leq a \leq 0.85$, $0 \leq a' \leq 0.30$, $0.001 \leq b \leq 0.50$, $0.02 \leq c \leq 0.85$, $0 < x \leq 0.30$, $0 \leq y \leq 0.30$, $0 \leq y' \leq y$, $0 \leq p \leq 0.45$, $b+y<0.62$, and $a+b+c+x+y+p=1.00$; and if present, $Mm \leq 12$ at. %; preferably, $0.15 \leq a \leq 0.63$, $0.01 \leq b \leq 0.38$, $0.15 \leq c \leq 0.60$, $0 < x \leq 0.15$, $0 \leq y \leq 0.15$ and $0 \leq p \leq 0.30$.

Several exemplary alloys related to the third group of the present invention are:

$Ti_aTa_bNi_cR_x Cr_yQ_{p-a'}Zr_{a'}$,
$Ti_aTa_bNi_cR_x Cr_yV_{y'}Q_{p-a'-y'}Zr_{a'}$,
$Ti_aTa_bNi_cR_x Cu_yQ_{p-a'}Zr_{a'}$,
$Ti_aTa_bNi_cR_x Cr_{y-y'}Mn_yQ_p$, and its hydride thereof; where R is at least one element selected from the group consisting of B, Hf, Sc, Zn, Sb, W, Sn, N, O, Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm; and where the atomic mole ratios: a,a',b, c,x,y,y', and p are defined by: $0.10 \leq a \leq 0.85$, $0 \leq a' \leq 0.30$, $0.001 \leq b \leq 0.50$, $0.02 \leq c \leq 0.85$, $0 < x \leq 0.30$, $0 \leq y \leq 0.30$, $0 \leq y' \leq y$, $0 \leq p \leq 0.45$, $b+y<0.62$, and $a+b+c+x+y+p=1.00$; and if present, $Mm \leq 12$ at. %; preferably, $0.15 \leq a \leq 0.63$, $0.01 \leq b \leq 0.38$, $0.15 \leq c \leq 0.60$, $0 < x \leq 0.15$, $0 \leq y \leq 0.15$ and $0 \leq p \leq 0.30$.

Several exemplary alloys related to the fourth group of the present invention are:

$Ti_aV_bNi_cR_x Cu_yQ_{p-a'}Zr_{a'}$,
$Ti_aV_bNi_cR_x Mn_yQ_{p-a'-b'}Zr_{a'}Mo_{b'}$,
$Ti_aV_bNi_cR_x Mn_{y-y'}Cr_{y'}Q_{p-a'-b'}Zr_{a'}Mo_{b'}$, and its hydride thereof; where R is at least one element selected from the group consisting of B, Hf, Sc, Zn, Sb, W, Sn, N, O Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Y, Ta, La, Ce, and Mm; and where the atomic mole ratios: a,a',b,b',c, x,y,y', and p are defined by: $0.10 \leq a \leq 0.85$, $0 \leq a' \leq 0.30$, $0 \leq b' \leq 0.30$, $0.001 \leq b \leq 0.50$, $0.02 \leq c \leq 0.85$, $0 < x \leq 0.30$, $0 \leq y \leq 0.30$, $0 \leq y' \leq y$, $0 \leq p \leq 0.45$, $b+y<0.62$, and $a+b+c+x+y+p=1.00$; and if present, $Mm \leq 12$ at. %; preferably, $0.15 \leq a \leq 0.63$, $0.01 \leq b \leq 0.38$, $0.15 \leq c \leq 0.60$, $0 < x \leq 0.15$ and $0 \leq p \leq 0.30$.

Alloys having compositions according to the present invention such as the list given in Table 1 can be prepared first by mixing proper amounts of the elements or mixing elements with other commercially available master alloys such as nickel-zirconium, nickel-vanadium, ferrovanadium, ferrotitanium, aluminum-vanadium, nickel-niobium, etc., and then melting them in a crucible selected from graphite, alumina, zirconia or water-cooled copper, in an induction or arc furnace under a protective atmosphere selected from inert gases such as argon, hydrogen nitrogen, hydrocarbon gas or a mixture thereof. The homogeneous molten alloy is poured into a mold to obtain a solid ingot. The mold is made of a material similar to that of the crucible. The alloy ingot made can be crushed first by a conventional method such as using a press; the crushed pieces are then pulverized to powder by hydriding/dehydriding cycles. Moderate to slightly high temperature of between 100 to 450 degrees Centigrade will accelerate the hydriding/dehydriding processes. The hydrogen storage electrode containing the active material of the present invention is then prepared by a sintered or pasted method with or without one or more powder binders selected from the group consisting of nickel, copper, aluminum, zinc, carbon black, PTFE, CMC, PVA (polyvinyl alcohol), polyox, methylcellulose and hydroxylmethyl cellulose. The sizes of the powder binder are from 0.2 to 150 micrometers, preferably from 0.5 to 50 micrometers. The substrate current collector can be nickel or nickel-plated steel mesh, sponge, or perforated or expanded foil. In case of the sintered method, dried alloy powder having size of from 100 mesh to 400 mesh, with or without the powder binders aforementioned, is pressed with a pair of rollers onto the substrate to form the preliminary electrode which is then heated, under vacuum or a protective atmosphere such as argon, nitrogen, hydrocarbon gas, hydrogen, or a mixture thereof, at temperatures of from 200 to 1100 degrees Centigrade for 10 to 60 minutes; preferably, at temperatures from 450 to 950 degree Centigrade for 10 to 20 minutes. In the case of the pasting method, the alloy powder having sizes of from 100 mesh to 400 mesh is mixed with one or more of the aforementioned powder binders and pure water to make a paste or slurry. Then the paste or slurry is pressed onto the substrate current collector by pasting, printing or a doctor blade method. The resulting wet hydrogen storage hydride electrode is then dried at temperatures of from 60 to 300 degrees Centigrade for 20 to 90 minutes under vacuum or a protective atmosphere selected from the group consisting of argon, nitrogen, hydrocarbon, hydrogen or the combination thereof. The dried hydrogen storage electrode, if necessary, can be treated with a weak acidic solution with a pH value between 3 and 7, preferably 5.5 to 6.5, at temperatures of between 20 to 120 degrees Centigrade for 5 to 60 minutes. Alternatively, the electrode can be treated with an alkaline solution at a temperature between 40 and 120 degrees Centigrade for 10 minutes to 15 hours. The electrode made thus is ready to be used as a negative electrode.

Figure 2:
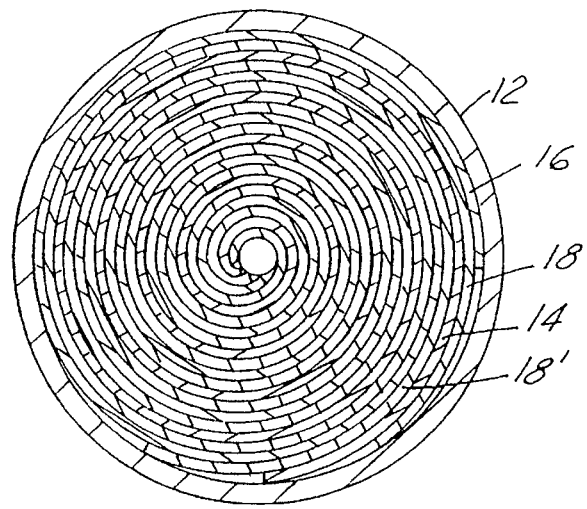
FIG. 2 is a sectional view of the battery according to the present invention, seen along line 2—2 in FIG. 1.

The exemplary alloy of the present invention and its hydride electrode thereof mentioned above were made, tested, and used to make rechargeable hydride cells. The battery is composed of a container, a positive electrode, a negative electrode comprising a body of rechargeable hydrogen storage active material and/or the hydride thereof, a separator positioned between the positive and negative electrodes, and electrolyte in the container and in contact with the positive and negative electrodes and the separator. An example of a hydride battery according to the present invention is depicted in FIGS. 1 and 2. In this drawing, a sealed metal oxide-hydride battery 10 is composed of a container in the form of an exterior casing 12, a positive electrode 14, a negative (hydride) electrode 16 and a separator 18 disposed between the positive and negative electrodes. In this regard, the negative electrode 16, positive electrode 14 and the separator 18 are mutually spirally wound, as shown in FIG. 2. A cover 20 is sealably connected with the casing 12, and is provided with a resealable safety vent 22.

TABLE 1

| Alloy No. | Alloy Composition |
|---|---|
| | Group 1 |
| 1 | $Ti_{0.13}Nb_{0.50}Ni_{0.17}Hf_{0.05}Cr_{0.09}Mn_{0.06}$ |
| 2 | $Ti_{0.41}Nb_{0.09}Ni_{0.40}Hf_{0.01}B_{0.03}Cu_{0.04}Mm_{0.02}$ |
| 3 | $Ti_{0.30}Nb_{0.24}Ni_{0.28}Sn_{0.03}Cr_{0.12}Co_{0.03}$ |
| 4 | $Ti_{0.30}Nb_{0.35}Ni_{0.05}Sn_{0.05}Mn_{0.20}Al_{0.05}$ |
| 5 | $Ti_{0.32}Nb_{0.14}Ni_{0.25}Sn_{0.05}Mn_{0.10}Zr_{0.15}$ |
| 6 | $Ti_{0.26}Nb_{0.10}Ni_{0.41}W_{0.02}Mn_{0.06}Zr_{0.15}$ |
| 7 | $Ti_{0.08}Nb_{0.34}Ni_{0.30}Zn_{0.04}Cr_{0.02}Al_{0.02}Zr_{0.20}$ |
| 8 | $Ti_{0.22}Nb_{0.14}Ni_{0.39}B_{0.02}Cr_{0.05}Mn_{0.04}Zr_{0.14}$ |
| 9 | $Ti_{0.28}Nb_{0.25}Ni_{0.32}Hf_{0.03}Mo_{0.02}Al_{0.03}Cu_{0.01}Zr_{0.06}$ |
| 10 | $Ti_{0.16}Nb_{0.32}Ni_{0.22}Hf_{0.03}Cr_{0.12}Mn_{0.04}Zr_{0.10}$ |
| 11 | $Ti_{0.26}Nb_{0.09}Ni_{0.40}Sb_{0.02}Cr_{0.06}Cu_{0.02}Zr_{0.15}$ |
| 12 | $Ti_{0.22}Nb_{0.07}Ni_{0.43}Sn_{0.02}Cr_{0.03}Al_{0.02}V_{0.04}Zr_{0.17}$ |
| 13 | $Ti_{0.27}Nb_{0.06}Ni_{0.40}Zn_{0.04}Mn_{0.04}Al_{0.01}Zr_{0.18}$ |
| 14 | $Ti_{0.11}Nb_{0.52}Ni_{0.18}W_{0.02}Cr_{0.13}Co_{0.02}Zr_{0.02}$ |
| 15 | $Ti_{0.06}Nb_{0.26}Ni_{0.34}Zn_{0.04}Mo_{0.03}Al_{0.02}Zr_{0.25}$ |
| 16 | $Ti_{0.20}Nb_{0.07}Ni_{0.37}Sn_{0.01}Cr_{0.06}Mn_{0.07}Zr_{0.22}$ |
| 17 | $Ti_{0.28}Nb_{0.08}Ni_{0.38}Zn_{0.04}Cu_{0.04}Zr_{0.18}$ |
| 18 | $Ti_{0.22}Nb_{0.20}Ni_{0.30}B_{0.06}Si_{0.02}Zr_{0.20}$ |
| | Group 2 |
| 19 | $Ti_{0.34}Hf_{0.06}Ni_{0.25}Nb_{0.30}Al_{0.05}$ |
| 20 | $Ti_{0.50}Hf_{0.03}Ni_{0.35}Mn_{0.08}Cu_{0.04}$ |
| 21 | $Ti_{0.48}Hf_{0.08}Ni_{0.38}Si_{0.03}Cr_{0.03}$ |
| 22 | $Ti_{0.44}Hf_{0.05}Ni_{0.35}V_{0.05}Mn_{0.05}Si_{0.05}Co_{0.01}$ |
| 23 | $Ti_{0.36}Hf_{0.16}Ni_{0.28}V_{0.15}B_{0.02}Mm_{0.03}$ |
| 24 | $Ti_{0.16}Hf_{0.06}Ni_{0.25}Nb_{0.30}Al_{0.05}Zr_{0.18}$ |
| 25 | $Ti_{0.25}Hf_{0.02}Ni_{0.40}Nb_{0.05}Zr_{0.28}$ |
| 26 | $Ti_{0.20}Hf_{0.11}V_{0.06}Cr_{0.06}Ni_{0.41}Mn_{0.04}Zr_{0.12}$ |
| 27 | $Ti_{0.23}Hf_{0.01}V_{0.20}Ni_{0.43}Si_{0.03}Zr_{0.10}$ |
| 28 | $Ti_{0.24}Hf_{0.02}Ni_{0.35}V_{0.15}Si_{0.04}Mo_{0.03}Zr_{0.17}$ |
| 29 | $Ti_{0.25}Hf_{0.01}V_{0.08}Cr_{0.06}Ni_{0.39}Si_{0.04}Zr_{0.17}$ |
| 30 | $Ti_{0.10}Hf_{0.08}Nb_{0.43}Ni_{0.20}Cr_{0.08}Al_{0.02}Zr_{0.08}Fe_{0.01}$ |
| 31 | $Ti_{0.26}Hf_{0.06}Ni_{0.39}Mo_{0.03}Cr_{0.04}Cu_{0.04}Zr_{0.18}$ |
| 32 | $Ti_{0.16}Hf_{0.06}Ni_{0.25}Nb_{0.26}Al_{0.05}Mn_{0.04}Zr_{0.18}$ |
| | Group 3 |
| 33 | $Ti_{0.36}Ta_{0.15}Ni_{0.25}Hf_{0.04}V_{0.15}Al_{0.05}$ |
| 34 | $Ti_{0.38}Ta_{0.08}Ni_{0.24}Hf_{0.06}Nb_{0.20}Cr_{0.04}$ |
| 35 | $Ti_{0.41}Ta_{0.12}Ni_{0.38}Hf_{0.02}Mn_{0.05}W_{0.02}$ |
| 36 | $Ti_{0.16}Ta_{0.05}Ni_{0.39}B_{0.05}Nb_{0.30}Mm_{0.05}$ |
| 37 | $Ti_{0.16}Ta_{0.08}Ni_{0.36}Hf_{0.04}Nb_{0.30}Al_{0.04}Mo_{0.02}$ |
| 38 | $Ti_{0.16}Ta_{0.12}Ni_{0.38}Sn_{0.03}Cr_{0.04}Zr_{0.25}Fe_{0.02}$ |
| 39 | $Ti_{0.20}Ta_{0.09}Ni_{0.30}B_{0.04}Cr_{0.08}Mn_{0.10}Zr_{0.20}$ |
| 40 | $Ti_{0.10}Ta_{0.04}Ni_{0.50}Zn_{0.05}Mo_{0.06}Al_{0.05}Zr_{0.20}$ |
| | Group 4 |
| 41 | $Ti_{0.36}V_{0.20}Ni_{0.25}Hf_{0.04}Cu_{0.05}Cr_{0.05}Al_{0.05}$ |
| 42 | $Ti_{0.36}V_{0.15}Ni_{0.35}Hf_{0.04}Mn_{0.05}Mo_{0.05}$ |
| 43 | $Ti_{0.35}V_{0.10}Ni_{0.35}Hf_{0.04}Mm_{0.05}Mo_{0.05}Co_{0.06}$ |
| 44 | $Ti_{0.28}V_{0.15}Ni_{0.35}B_{0.04}Mn_{0.05}Cr_{0.10}Si_{0.03}$ |
| 45 | $Ti_{0.18}V_{0.35}Ni_{0.33}Sn_{0.04}Mn_{0.05}Co_{0.05}$ |
| 46 | $Ti_{0.36}V_{0.15}Ni_{0.35}Hf_{0.04}Mn_{0.05}Mo_{0.05}$ |
| 47 | $Ti_{0.25}V_{0.16}Ni_{0.34}B_{0.04}Cr_{0.05}Zr_{0.16}$ |
| 48 | $Ti_{0.13}V_{0.34}Ni_{0.34}B_{0.02}Cr_{0.05}Zr_{0.11}$ |
| 49 | $Ti_{0.30}V_{0.18}Ni_{0.29}Hf_{0.03}Cr_{0.05}Mn_{0.10}Zr_{0.05}$ |
| 50 | $Ti_{0.20}V_{0.08}Ni_{0.30}W_{0.04}Co_{0.08}Mn_{0.15}Zr_{0.15}$ |
| 51 | $Ti_{0.20}V_{0.05}Ni_{0.42}B_{0.04}Si_{0.04}Mm_{0.10}Zr_{0.15}$ |
| 52 | $Ti_{0.23}V_{0.05}Ni_{0.43}B_{0.04}Mn_{0.08}Zr_{0.17}$ |
| 53 | $Ti_{0.17}V_{0.08}Ni_{0.38}Hf_{0.04}Mn_{0.10}Al_{0.03}Zr_{0.20}$ |
| 54 | $Ti_{0.20}V_{0.08}Ni_{0.40}B_{0.04}Mn_{0.07}Al_{0.03}Zr_{0.18}$ |
| 55 | $Ti_{0.25}V_{0.06}Ni_{0.43}Hf_{0.02}Mn_{0.14}Zr_{0.10}$ |
| 56 | $Ti_{0.27}V_{0.13}Mn_{0.08}V_{0.08}Ni_{0.40}Zn_{0.02}Cu_{0.02}$ |
| 57 | $Ti_{0.22}Zr_{0.17}Mn_{0.04}V_{0.10}Ni_{0.43}Sn_{0.02}Mo_{0.02}$ |
| 58 | $Ti_{0.13}Zr_{0.12}Mn_{0.08}V_{0.30}Ni_{0.28}Sb_{0.02}Cr_{0.07}$ |
| 59 | $Ti_{0.25}Zr_{0.15}Mn_{0.05}V_{0.08}Ni_{0.40}Mo_{0.03}B_{0.04}$ |
| 60 | $Ti_{0.26}Zr_{0.17}Mn_{0.06}V_{0.06}Ni_{0.40}Hf_{0.02}Cr_{0.03}$ |
| 61 | $Ti_{0.16}V_{0.10}Mn_{0.04}V_{0.32}Ni_{0.22}Hf_{0.04}Cr_{0.08}Al_{0.04}$ |
| 62 | $Ti_{0.25}Zr_{0.17}V_{0.08}Cr_{0.06}Ni_{0.39}Hf_{0.01}Zn_{0.04}$ |

An electrically insulating member 24 separates the cover 20 from the casing 12. A first tab 26 is connected with the positive electrode 14. The first tab 26 is mounted to the casing 12 by an electrically insulating member 24' and is also connected with the cover 20, resulting in the cover being the positive terminal 28 of the battery 10. A second tab is connected with the bottom 32 of the casing, making the bottom the negative terminal 34 of the battery 10. Before the cover 20 is sealed with respect to the casing 12, a suitable amount of electrolyte is placed within the casing. For example, the casing 12 and cover 20 is a suitable conductive metal, the positive electrode 14 is sheet nickel hydroxide, the negative electrode 16 is a sheet of a hydrogen storage material and/or its hydride thereof according to the present invention, the separator 18 is sheet nylon, and the electrolyte is a KOH+LiOH aqueous solution.

In operation, as shown in Equations 1 and 2, during charging hydroxide ions pass through the separator via the electrolyte from the negative electrode to the positive electrode, and water molecules pass through the separator via the electrolyte from the positive electrode to the negative electrode. During discharge, wherein a load is placed across the positive and negative terminals, water molecules pass through the separator, via the electrolyte, from the negative electrode to the positive electrode, and hydroxide ions pass through through the separator, via the electrolyte, from the positive electrode to the negative electrode.

EXAMPLE 1

Table 1 lists some alloys having compositions in the present invention. The hydrogen storage electrodes were prepared by a pasting, sintering or the combination method using nickel-plated mesh as a collector. The electrodes containing about 1–3 grams active material were tested electrochemically in a 30 wt. % KOH solution with a nickle positive electrode as the counter electrode. The electrochemical performance such as capacity, rate capability and cycle life was measured at various rates to −0.75 V versus Hg/HgO reference electrode. The results indicated that these alloys have a capacity of from 280 to 380 mah/g. They also have good rate capability and are very easy to activate.

EXAMPLE 2

The alloy of the present invention, $Ti_{0.20}Cr_{0.15}Hf_{0.05}V_{0.40}Ni_{0.20}$, was used as active materials of negative electrode in the rechargeable sealed AA-size nickel-hydride cell (cell A). It was packed with a pasted nickel positive electrode and nonwoven nylon separator. The electrolyte was 30 wt. % KOH+5% LiOH solution. For comparison, a similar AA-size cell (cell B) with $Ti_{0.15}Cr_{0.15}V_{0.50}Ni_{0.20}$ of prior art as the active material of the negative electrode was made. Cell A used 10% less of V metal than that in B in the negative electrode materials. After activation and 1500 mah charging, the testing results indicated that cell A of the present invention had an internal pressure of 14 atm and a capacity of 1253 mah; but cell B of prior art had an internal pressure of 35 atm and a capacity of 1050 mah. Obviuly, the cell A of the present invention has a much better performance than cell B of the prior art.

EXAMPLE 3

The alloy of the present invention $Ti_{0.15}Cr_{0.10}Hf_{0.03}Nb_{0.45}Ni_{0.22}Mn_{0.05}$, was used as active materials of negative electrode in the rechargeable sealed AA-size nickel-hydride cell (cell A). It was packed with a pasted nickel positive electrode and nonwoven nylon separator. The electrolyte was 30 wt. % KOH+5% LiOH solution. For comparison, a similar AA-size cell (cell B) with $Ti_{0.15}Cr_{0.10}V_{0.50}Ni_{0.20}Mn_{0.05}$ of prior art as the active material of the negative electrode was made. Cell A used a lower cost of Nb metal, and cell B used a much higher cost of V metal in the negative electrode materials. After activation and 1500 mah charging, the testing results indicated that cell A of the present invention has an internal pressure of 10 atm and a capacity of 1286 mah; but cell B of prior art has an internal pressure of 35 atm and a capacity of 1050 mah. Obviouly, the cell A of the present invention has a much better performance than cell B of the prior art.

EXAMPLE 4

In according with the present invention, an active material of negative electrode, $Ti_{0.25}Zr_{0.17}Nb_{0.08}Hf_{0.01}Cr_{0.06}Ni_{0.39}Mn_{0.04}$ and a sintered hydrogen storage/hydride electrode thereof were made. A suitable size of this negative electrode was cut. According to the present invention, a matching sintered nickel positive electrode and nylon separator were provided to make a rechargeable AA-size sealed nickel-hydride cell. The cell was easy to activate. The cell was charged to 1.50 V at 0.2 C-rate and discharged to 1.0 V. The capacity was up to 1.38 AH at 0.3 C-rate. It was cycled 258 times and no significant degradation was observed.

EXAMPLE 5

In according with the present invention, an active material of negative electrode, $Ti_{0.25}Zr_{0.17}V_{0.06}Mo_{0.03}Ni_{0.42}Hf_{0.03}Cu_{0.04}$, and a sintered hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The cell was easy to activate. It was charged to 1.50 V at 0.2 C-rate and discharged to 1.0 V. The capacity was up to 1320 mAH at 0.3 C-rate. It was cycled 345 times without significant degradation.

EXAMPLE 6

In accordance with the present invention, an active material of negative electrode, $Ti_{0.16}Zr_{0.27}Ta_{0.05}V_{0.08}Ni_{0.38}B_{0.03}Cr_{0.03}$ and a pasted hydrogen storage/hydride electrode thereof were made. A suitable size of this negative electrode was cut. According to the present invention, a matching pasted nickel positive electrode and nylon separator were provided to make a rechargeable AA-size sealed nickel-hydride cell. The cell was charged to 1.50 V at 0.2 C-rate and discharged to 1.0 V. The capacity was up to 1245 mAH at a 1.0 A current.

What is claimed is:

1. A material for hydrogen storage and hydrogen storage electrode, said material comprising a multicomponent alloy having a composition represented by the formula:

$Ti_aNb_bNi_cR_xD_yQ_p$ and its hydride thereof, where R is at least one element selected from the group consisting of B, Hf, Sc, Zn, Sb, W, Sn, N, O, Ge, and Ga; D is at least one element selected from the group consisting of Mn, Cu, Si, and Mm, where Mm is the mischmetal; Q is at least one element selected from the group consisting of C, Mg, Ca, Sr, Ba, Al, Si, V, Mn, Fe, Co, Cu, Zr, Mo, Pd, Ag, Y, Ta, La, Ce, and Mm, where Mm is a mischmetal; and where the atomic mole ratios: a,b,c,x,y and p are defined by: $0.10 \leq a \leq 0.85$, $0.001 \leq b < 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, Mm$\leq$12 at. %.

2. A material of claim 1 for hydrogen storage and hydrogen storage electrode, wherein $0.15 < a < 0.63$, $0.01 < b < 0.38$, $0.15 < c < 0.60$, $0 < x < 0.15$, $0 < y < 0.15$ and $0 < p < 0.30$.

3. A material of claim 1 for hydrogen storage and hydrogen storage electrode, wherein said R is at least one element selected from the group consisting of B, Hf, Zn, W, and Sn; Q is at least one element selected from the group consisting of Ca, Al, Si, V, Mn, Fe, Co, Cu, Zr, Mo, and Mm.

4. A material for hydrogen storage and hydrogen storage electrode, said material comprising a multicomponent alloy selected from the group represented by the formulas:

$Ti_aNb_bNi_cR_xCr_yQ_p$,
$Ti_aNb_bNi_cHf_xCr_{y-y'}Mn_{y'}Q_p$,
$Ti_aNb_bNi_cSn_xCr_{y-y'}Mn_{y'}Q_p$,
$Ti_aNb_bNi_cR_xMn_yQ_{p-a'}Zr_{a'}$,
$Ti_aNb_bNi_cR_xCr_yQ_{p-a'}Zr_{a'}$,
$Ti_aNb_bNi_cHf_xCr_{y-y'}Mn_{y'}Q_{p-a'}Zr_{a'}$,
$Ti_aNb_bNi_cSn_xCr_{y-y'}Mn_{y'}Q_{p-a'}Zr_{a'}$,
$Ti_aNb_bNi_cR_xCr_yQ_{p-a'-b'}Zr_{a'}V_{b'}$,
$Ti_aNb_bNi_cR_xCr_yQ_{p-a'-b'}Zr_{a'}Cu_{b'}$,
$Ti_aNb_bNi_cR_xCr_yQ_{p-a'-b'}Zr_{a'}Al_{b'}$,
$Ti_aNb_bNi_cHf_xCr_{y-y'}Mn_{y'}Q_{p-a'-b'}Zr_{a'}Al_{b'}$, and its hydride thereof; where R is at least one element selected from the group consisting of B, Hf, Sc, Zn, Sb, W, Sn, N, O, Ge, Ga, P, S, and alkali metals; Q is at least one element selected from the group consisting of C, Mg, Ca, Sr, Ba, Al, Si, V, Cr, Mn, Fe, Co, Cu, Zr, Mo, Pd, Ag, Y, Ta, La, Ce, and Mm; and where the atomic mole ratios: a,a',b,c,x, y,y', and p are defined by: $0.10 \leq a \leq 0.85$, $0 \leq a' \leq 0.30$, $0.001 \leq b \leq 0.50$, $0 \leq b' \leq 0.30$, $0.02 \leq c \leq 0.85$, $0 < x \leq 0.30$, $0 < y \leq 0.30$, $0 \leq y' < y$, $0 < p \leq 0.45$, $b+y < 0.62$, and $a+b+c+x+y+p=1.00$; and if present, Mm$\leq$12 at. %.

5. A material of claim 4 for hydrogen storage and hydrogen storage electrode, wherein $0.15 < a < 0.63$, $0.01 < b < 0.38$, $0.15 < c < 0.60$, $0 < x < 0.15$, $0 < p < 0.30$ and $0 \leq a' < 0.30$.

6. A material of claim 4 for hydrogen storage and hydrogen storage electrode, wherein $0.15 < a < 0.63$, $0.01 < b < 0.38$, $0.15 < c < 0.60$, $0 < x < 0.15$, $0 < y < 0.15$ $0 < p < 0.30$ and $a' < 0.30$.

7. A material for hydrogen storage and hydrogen storage electrode, said material comprising a multicomponent alloy having a composition represented by the formula:

$Ti_aHf_bNi_cR_xD_yQ_p$ and its hydride thereof, where R is at least one element selected from the group consisting of B, Hf, Sc, Zn, Sb, W, Sn, N, O, Ge, and Ga; D is at least one element selected from the group consisting of Mn, Cu, Si, and Mm, where Mm is the mischmetal; Q is at least one element selected from the group consisting of C, Mg, Ca, Sr, Ba, Al, Si, V, Mn, Fe, Co, Cu, Zr, Nb, Mo, Pd, Ag, Y, Ta, La, Ce, and Mm, where Mm is a mischmetal; and where the atomic mole ratios: a,b,c,x,y and p are defined by: $0.10 \leq a \leq 0.85$, $0.001 \leq b \leq 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, Mm$\leq$12 at. %.

8. A material of claim 7 for hydrogen storage and hydrogen storage electrode, wherein $0.15 < a < 0.63$, $0.01 < b < 0.38$, $0.15 < c < 0.60$, $0 < x < 0.15$, $0 < y < 0.15$ and $0 < p < 0.30$.

9. A material of claim 7 for hydrogen storage and hydrogen storage electrode, where said R is at least one element selected from the group consisting of B, Hf, Zn, W, and Sn; Q is at least one element selected from the group consisting of Ca, Al, Si, V, Mn, Fe, Co, Cu, Zr, Mo, and Mm, where Mm is a mischmetal.

10. A material for hydrogen storage and hydrogen storage electrode, said material comprising a multicomponent alloy having a composition represented by the formula:

$Ti_aTa_bNi_cR_xD_yQ_p$
and its hydride thereof, where R is at least one element selected from the group consisting of B, Sc, Zn, Sb, W, Sn, N, O, Ge, and Ga; D is at least one element selected from the group consisting of Mn, Cu, Si, and Mm, where Mm is the mischmetal; Q is at least one element selected from the group consisting of C, Mg, Ca, Sr, Ba, Al, Si, V, Mn, Fe, Co, Cu, Zr, Nb, Mo, Pd, Ag, Y, La, Ce, and Mm, where Mm is a mischmetal; and where the atomic mole ratios: a,b,c,x,y and p are defined by: $0.10 \leq a \leq 0.85$, $0.001 \leq b \leq 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, $Mm \leq 12$ at. %.

11. A material of claim 10 for hydrogen storage and hydrogen storage electrode, wherein $0.15 < a < 0.63$, $0.01 < b < 0.38$, $0.15 < c < 0.60$, and $0 < x < 0.15$, $0 < y < 0.15$ and $0 < p < 0.30$.

12. A material of claim 10 for hydrogen storage and hydrogen storage electrode, wherein said R is at least one element selected from the group consisting of B, Hf, Zn, W, and Sn; Q is at least one element selected from the group consisting of Ca, Al, Si, V, Mn, Fe, Co, Cu, Zr, Mo, and Mm.

13. A material for hydrogen storage and hydrogen storage electrode, said material comprising a multicomponent alloy having a composition represented by the formula:

$Ti_aV_bNi_cR_xD_yQ_p$ and its hydride therof, where R is at least one element selected from the group consisting of B, Hf, Sc, Zn, Sb, W, Sn, N, O, Ge, and Ga; D is at least one element selected from the group consisting Mn, Cu, Si, and Mm, where Mm is the mischmetal; Q is at least one element selected from the group consisting of C, Mg, Ca, Sr, Ba, Al, Si, Mn, Fe, Co, Cu, Zr, Nb, Mo, Pd, Ag, Y, Ta, La, Ce, and Mm, where Mm is a mischmetal; and where the atomic mole ratios: a,b,c,x,y and p are defined by: $0.10 \leq a \leq 0.85$, $0.001 \leq b \leq 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, $Mm \leq 12$ at. %.

14. A material of claim 13 for hydrogen storage and hydrogen storage electrode, wherein said $0.15 < a < 0.63$, $0.01 < b < 0.38$, $0.15 < c < 0.60$, $0 < x < 0.15$, $0 < y < 0.15$ and $0 < p < 0.30$.

15. A material of claim 13 for hydrogen storage and hydrogen storage electrode, wherein said R is at least one element selected from the group consisting of B, Hf, Zn, W, and Sn; Q is at least one element selected from the group consisting of Ca, Al, Si, Mn, Fe, Co, Cu, Zr, Mo, and Mm.

16. A hydride battery, wherein said battery comprises a positive electrode, a negative electrode, a separator between the positive and negative electrodes, and an electrolyte in the container and in contact with the positive and negative electrodes and separator; said negative electrode comprising a hydrogen storage/hydride active material selected from the group consisting of:

$Ti_aNb_bNi_cR_xD_yQ_p$ and its hydride thereof, where R is at least one element selected from the group of B, Hf, Sc, Zn, Sb, W, Sn, N, O, Ge, and Ga; D is at least one element selected from the group consisting of Mn, Cu, Si, Cr, and Mm, where Mm is the mischmetal; Q is at least one element selected from the group consisting of C, Mg, Ca, Sr, Ba, Al, Si, Mn, Fe, Co, Cu, Zr, Mo, Pd, Ag, Y, Ta, and Mm, where Mm is a mischmetal; and where the atomic mole ratios: a,b,c,x,y and p are defined by: $0.10 \leq a \leq 0.85$, $0.001 \leq b \leq 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, $Mm \leq 12$ at. %.

17. A hydride battery, wherein said battery comprises a positive electrode, a negative electrode, a separator between the positive and negative electrodes, and an electrolyte in the container and in contact with the positive and negative electrodes and separator; said negative electrode comprising a hydrogen storage/hydride active material selected from the group consisting of:

$Ti_aHf_bNi_cR_xD_yQ_p$ and its hydride thereof, where R is at least one element selected from the group consisting of B, Hf, Sc, Zn, Sb, W, Sn, N, O, Ge, and Ga; D is at least one element selected from the group consisting of Mn, Cu, Si, Cr, and Mm, where Mm is the mischmetal; Q is at least one element selected from the group consisting of C, Mg, Ca, Sr, Ba, Al, Si, Cr, Mn, Fe, Co, Cu, Zr, Nb, Mo, Pd, Ag, Y, Ta, and Mm, where Mm is a mischmetal; and where the atomic mole ratios: a,b,c,x,y and p are defined by: $0.10 \leq a \leq 0.85$, $0.001 \leq b \leq 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, $Mm \leq 12$ at. %.

18. A hydride battery, wherein said battery comprises a positive electrode, a negative electrode, a separator between the positive and negative electrodes, and an electrolyte in the container and in contact with the positive and negative electrodes and separator; said negative electrode comprising a hydrogen storage/hydride active material selected from the group consisting of:

$Ti_aTa_bNi_cR_xD_yQ_p$ and its hydride thereof, where R is at least one element selected from the group consisting of B, Hf, Sc, Zn, Sb, W, Sn, N, O, Ge, and Ga; D is at least one element selected from the group consisting of Mn, Cu, Si, Cr, and Mm, where Mm is the mischmetal; Q is at least one element selected from the group consisting of C, Mg, Ca, Sr, Ba, Al, Si, Cr, Mn, Fe, Co, Cu, Zr, Nb, Mo, Pd, Ag, Y, and Mm, where Mm is a mischmetal; and where the atomic mole ratios: a,b,c,x,y, and p are defined by: $0.10 \leq a \leq 0.85$, $0.001 \leq b \leq 0.50$, $0.02 \leq c \leq 0.85$, $0 < x < 0.30$, $0 \leq y < 0.30$, $0 < p < 0.45$, $b+y < 0.62$, and $a+b+c+x+y+p=1.00$; and if present, $Mm \leq 12$ at. %.

19. A hydride battery, wherein said battery comprises a positive electrode, a negative electrode a separator between the positive and negative electrodes, and an electrolyte in the container and in contact with the positive and negative electrodes and separator, said negative electrode comprising a hydrogen storage/hydride active material selected from the group consisting of:

$Ti_aV_bNi_cR_xD_yQ_p$, and its hydride thereof; where R is at least one element selected from the group consisting of B, Hf, Sc, Zn, Sb, W, Sn, N, O, Ge, and Ga; D is at least one element selected from the group consisting of Mn, Cu, Si, and Mm, where Mm is the mischmetal; Q is at least one element selected from the group consisting of C, Mg, Ca, Sr, Ba, Al, Si, Mn, Fe, Co, Cu, Zr, Nb, Mo, Pd, Ag, Y, Ta, and Mm, where Mm is a mischmetal; and where the atomic mole ratios: a,b,c,x,y and p are defined by: $0.10 < a < 0.85$, $0.001 < b < 0.50$, $0.02 < c < 0.85$, $0 < x < 0.30$, $0 \leq y < 0.30$, $0 < p < 0.45$, $b+y < 0.62$, and $a+b+c+x+y+p=1.00$; and if present, $Mm \leq 12$ at. %.

20. A material for hydrogen storage and hydrogen storage electrode, said material comprising a multicomponent alloy selected from the group represented by the formulas:

$Ti_aTa_bNi_cR_x\ Cr_yQ_{p-a'}Zr_{a'}$,
$Ti_aTa_bNi_cR_x\ Cr_yV_{y'}Q_{p-a'-y'}Zr_{a'}$,
$Ti_aTa_bNi_cR_x\ Cu_yQ_{p-a'}Zr_{a'}$,
$Ti_aTa_bNi_cR_x\ Cr_{y-y'}Mn_{y'}Q_p$, and its hydride thereof; where R is at least one element selected from the group consisting of B, Hf, Sc, Zn, Sb, W, Sn, N, O, Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm; and where the atomic mole ratios: a,a',b, c,x,y,y', and p are defined by: $0.10 \leq a \leq 0.85$, $0 \leq a' \leq 0.30$, $0.001 \leq b \leq 0.50$, $0.02 \leq c \leq 0.85$, $0 < x \leq 0.30$, $0 \leq y \leq 0.30$, $0 \leq y' \leq y$, $0 < p \leq 0.45$, $b+y < 0.62$, and $a+b+c+x+y+p=1.00$; and if present, $Mm \leq 12$ at. %.

21. A material of claim 20 for hydrogen storage and hydrogen storage electrode, wherein $0.15 < a < 0.63$, $0.01 < b < 0.38$, $0.15 < c < 0.60$, and $0 < x < 0.15$, $0 < y < 0.15$ $0 < p < 0.30$ and $a' < 0.30$.

22. A material for hydrogen storage and hydrogen storage electrode, said material comprising a multicomponent alloy selected from the group represented by the formulas:

$Ti_a Hf_b Ni_c R_x Mn_{y-y'} V_{y'} Q_p$,
$Ti_a Hf_b Ni_c R_x Cr_{y-y'} V_{y'} Q_{p-a'} Zr_{a'}$,
$Ti_a Hf_b Ni_c R_x Cu_y Q_{p-a'} Zr_{a'}$,
$Ti_a Hf_b Ni_c R_x Mn_y Q_{p-a'} Zr_{a'}$,
$Ti_a Hf_b Ni_c R_x Cu_{y-y'} Mn_{y'} Q_{p-a'} Zr_{a'}$,
$Ti_a Hf_b Ni_c R_x Cr_{y-y'} Mm_{y'} Q_{p-a'} Zr_{a'}$,
$Ti_a Hf_b Ni_c R_x Si_y Q_{p-a'} Zr_{a'}$,
$Ti_a Hf_b Ni_c R_x Si_y Q_{p-a'} Zr_{a'}$,
$Ti_a Hf_b Ni_c R_x Mm_y Q_{p-a'} Zr_{a'}$, and its hydride thereof; where R is at least one element selected from the group consisting of B, Hf, Sc, Zn, Sb, W, Sn, N, O, Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Ag, Y, Ta, La, Ce, and Mm; and where the atomic mole ratios: a,a',b, c,x,y,y', and p are defined by: $0.10 \leq a \leq 0.85$, $0 \leq a' \leq 0.30$, $0.001 \leq b \leq 0.50$, $0.02 \leq c \leq 0.85$, $0 < x \leq 0.30$, $0 \leq y \leq 0.30$, $0 \leq y' < y$, $0 < p \leq 0.45$, $b+y < 0.62$, and $a+b+c+x+y+p=1.00$; and if present, $Mm \leq 12$ at. %.

23. A material of claim 22 for hydrogen storage and hydrogen storage electrode, wherein $0.15 < a < 0.63$, $0.01 < b < 0.38$, $0.15 < c < 0.60$, $0 < x < 0.15$, $0 < y < 0.15$ and $0 < p < 0.30$.

24. A material for hydrogen storage and hydrogen storage electrode, said material comprising a multicomponent alloy selected from the group represented by the formulas:

$Ti_a V_b Ni_c R_x Cu_y Q_{p-a'} Zr_{a'}$,
$Ti_a V_b Ni_c R_x Mn_y Q_{p-a'-b'} Zr_{a'} Mo_{b'}$,
$Ti_a V_b Ni_c R_x Mn_{y-y'} Cr_{y'} Q_{p-a'-b'} Zr_{a'} Mo_{b'}$, and its hydride thereof; where R is at least one element selected from the group consisting of B, Hf, Sc, Zn, Sb, W, Sn, N, O, Ge, Ga, P, S, and alkali metals; Q is at least one element selected from the group consisting of C, Mg, Ca, Sr, Ba, Al, Si, V, Cr, Mn, Fe, Co, Cu, Zr, Nb, Mo, Pd, Y, Ta, La, Ce, and Mm; and where the atomic mole ratios: a,a',b,b',c, x,y,y', and p are defined by: $0.10 \leq a \leq 0.85$, $0 \leq a' \leq 0.30$, $0 \leq b' \leq 0.30$, $0.001 \leq b \leq 0.50$, $0.02 \leq c \leq 0.85$, $0 < x \leq 0.30$, $0 < y \leq 0.30$, $0 \leq y' < y$, $0 < p \leq 0.45$, $b+y < 0.62$, and $a+b+c+x+y+p=1.00$; and if present, $Mm \leq 12$ at. %

* * * * *